US006754046B2

(12) United States Patent
Barina et al.

(10) Patent No.: US 6,754,046 B2
(45) Date of Patent: Jun. 22, 2004

(54) INCREASED SLIP FORCE PIVOT BEARING

(75) Inventors: Jeffrey Gerard Barina, Loveland, CO (US); Ryan Andrew Sievers, Lyons, CO (US); Bruce Lynn Blakeslee, Golden, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/998,119

(22) Filed: Nov. 30, 2001

(65) Prior Publication Data

US 2003/0053260 A1 Mar. 20, 2003

Related U.S. Application Data

(60) Provisional application No. 60/324,120, filed on Sep. 20, 2001.

(51) Int. Cl.$^7$ ................................................ G11B 21/08
(52) U.S. Cl. ..................................................... 360/265.6
(58) Field of Search ........................... 360/265.6, 265.7, 360/265.8

(56) References Cited

U.S. PATENT DOCUMENTS

| 3,776,653 | A |   | 12/1973 | Buzogany |
|---|---|---|---|---|
| 4,835,644 | A |   | 5/1989 | Schulze |
| 5,646,800 | A |   | 7/1997 | Mihara et al. |
| 5,999,373 | A |   | 12/1999 | Allsup et al. |
| 6,018,441 | A | * | 1/2000 | Wu et al. ............ 360/265.6 |
| 6,163,441 | A |   | 12/2000 | Wood et al. |
| 6,299,358 | B1 |   | 10/2001 | Prater et al. |

FOREIGN PATENT DOCUMENTS

| GB | 1036181 | 7/1966 |
|---|---|---|
| WO | WO 01/59314 A1 | 8/2001 |

* cited by examiner

Primary Examiner—Allen Cao
(74) Attorney, Agent, or Firm—Derek J. Berger

(57) ABSTRACT

The sleeve of an actuator bearing cartridge is provided with an inclined surface on its outer surface. A tolerance ring is placed around the sleeve, and the cartridge and ring are then press-fit into the actuator bore together. Axial slippage of the ring and actuator relative to the cartridge is prevented as the ring is effectively wedged between the inclined surface and the inner surface of the actuator bore.

10 Claims, 4 Drawing Sheets

INCREASED SLIP FORCE PIVOT BEARING

CROSS-REFERENCE TO RELATED APPLICATIONS

This application claims the benefit of U.S. Provisional Application No. 60/324,120, filed Sep. 20, 2001.

FIELD OF THE INVENTION

This invention relates generally to the field of hard disc drive data storage devices, and more particularly, but not by way of limitation, to rotational movement of disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by precision ball bearing assemblies within a bearing housing. The actuator supports a flat coil which is suspended in the magnetic field of an array of permanent magnets, which are fixedly mounted to the disc drive housing base member. These magnets are typically mounted to pole pieces which are held in positions vertically spaced from another by spacers at each of their ends.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

As explained above, the actuator assembly typically includes an actuator body that pivots about a pivot mechanism disposed in a medial portion thereof. The function of the pivot mechanism is crucial in meeting performance requirements associated with the positioning of the actuator assembly. A typical pivot mechanism has two ball bearings with a stationary shaft attached to an inner race and a sleeve attached to an outer race. The sleeve is also secured within a bore in the actuator body. The stationary shaft typically is attached to the base deck and the top cover of the disc drive.

Bearing cartridges have been mounted within actuator bores in a variety of ways. Some have simply press-fit the cartridge into the bore; others have formed the bore of the actuator of plastic in order to facilitate such press-fitting. Still others have provided screws in the actuator body which extend into the bore, either to serve as set screws pressing against the cartridge sleeve or to engage threads in the cartridge sleeve so as to pull the cartridge into tight contact with the bore. However, all of these methods present additional problems: simple press-fitting risks damage to both the bore and cartridge; plastic bores are subject to thermal expansion and contraction, as well as fatigue; and providing screws and their bores requires additional parts, manufacturing steps and costs.

One solution to these problems has been to provide a groove in the outer surface of the sleeve, and then positioning a tolerance ring within the groove. The tolerance ring is typically made of a compressible yet resilient piece of material such as a corrugated steel sheet. The bearing cartridge and tolerance ring assembly is then press-fit into the bore of the actuator body, the tolerance ring holding the cartridge in place within the bore while yielding enough so that neither the cartridge nor the bore is damaged as a result of the press-fitting operation. This method has proven largely satisfactory.

However, even this arrangement raises other problems. For example, the bearing and tolerance ring are typically made of steel because of its high strength, while the actuator bore's inner surface is often made of aluminum because of its relatively low weight and cost. Aluminum is a much softer material than steel, so when the bearing cartridge and tolerance ring are pressed into the actuator bore, the steel corrugations tend to "bite" into the soft aluminum bore by mildly deforming the aluminum, resulting in a high level of friction between the ring and bore. Where the bearing cartridge is made of steel, however, there is little between the cartridge and ring to create friction between them. This greatly raises the risk of axial slippage between the bearing cartridge and the tolerance ring during shock events. In fact, tests have borne this out, indicating that slip between a steel ring and steel cartridge occurs at about a mere 20% of the force required to cause slip between the ring and an aluminum actuator bore.

In order to prevent slip between the cartridge and tolerance ring, then, it has generally been necessary to increase assembly forces to a very high degree. The result has been that slip between the cartridge and tolerance ring has been eliminated, by creating a tighter fit between the bore, ring and cartridge. The extremely tight fit has the added effects of making assembly more problematic, raising the risk of cartridge or actuator damage, and also results in frictional forces between the ring and bore far in excess of what is necessary to prevent slip between them.

What the prior art has been lacking is a bearing cartridge mounting arrangement which is easily assembled but which is resistant to slip when subject to axial forces.

SUMMARY OF THE INVENTION

The present invention is directed to an easily assembled bearing cartridge mounting arrangement. Prior to installing a bearing cartridge in an actuator bore, a tolerance ring is placed around the cartridge. The outer surface of the cartridge sleeve is provided with an inclined surface abutted by one end of the tolerance ring. The cartridge and ring are then press-fit into the actuator bore together. Axial movement of the cartridge is thereby minimized, eliminating the need to otherwise increase compressive forces between the ring and the bore and bearing. Additional features and benefits will become apparent upon a review of the attached figures and the accompanying description.

DETAILED DESCRIPTION OF THE INVENTION

Figure 1:
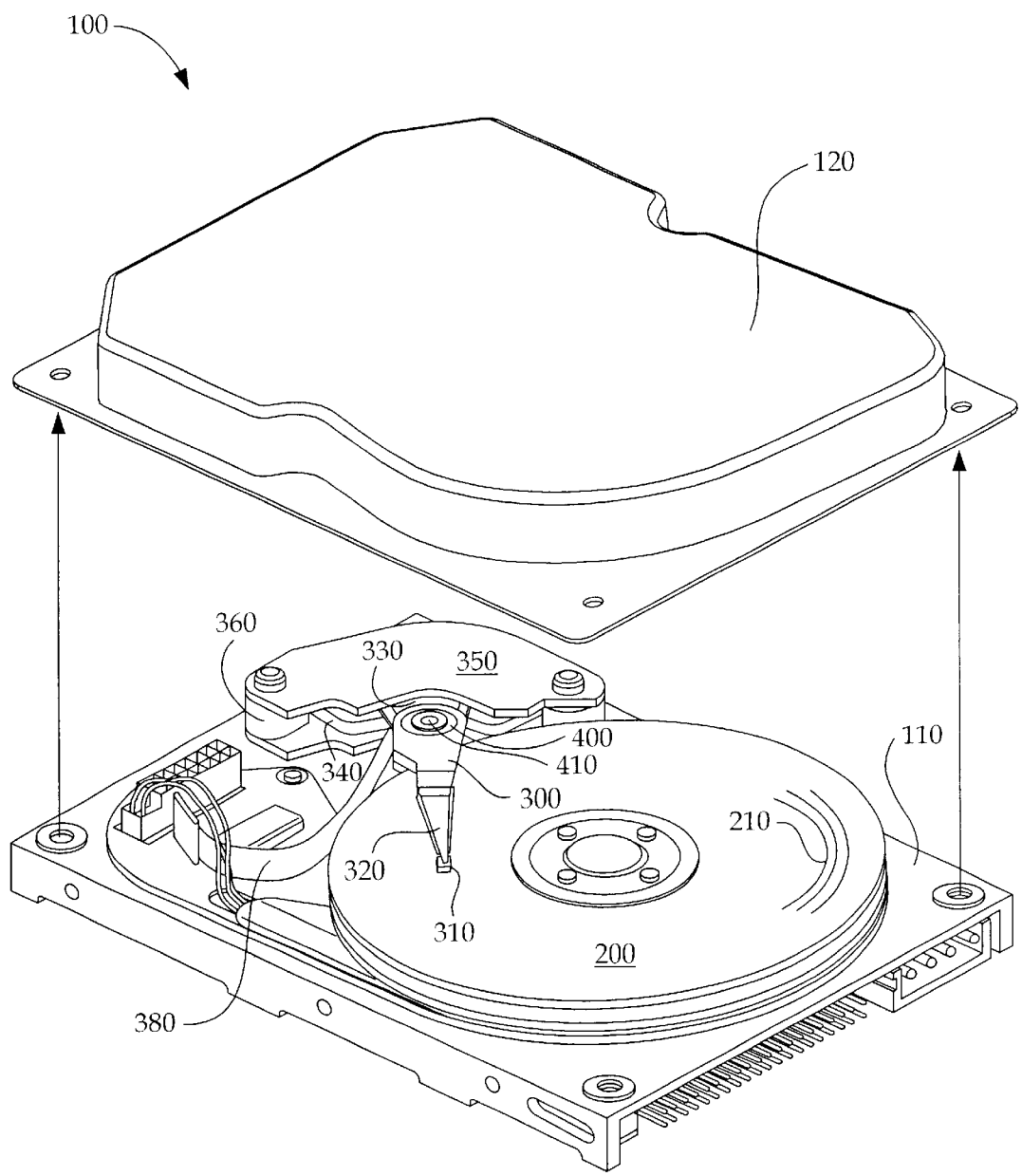
FIG. 1 shows an exploded view of a disc drive incorporating the bearing mounting assembly of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

The disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 310 are supported by flexures 320, which are attached to arm portions of actuator 300. The actuator 300 is mounted to a bearing assembly 400 which includes a stationary pivot shaft 410 about which the actuator 300 rotates.

Power to drive the actuator 300 about the pivot shaft 410 is provided by a voice coil motor (VCM). The VCM consists of a coil 330 which is supported by the actuator 300 within the magnetic field of a permanent magnet assembly having spaced upper and lower magnets 340. The magnets 340 are mounted to spaced pole pieces 350 which are fixed to the deck 110 and are further spaced from one another by spacers 360. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 380, which also transmits data signals to and from the heads 310.

Figure 2:
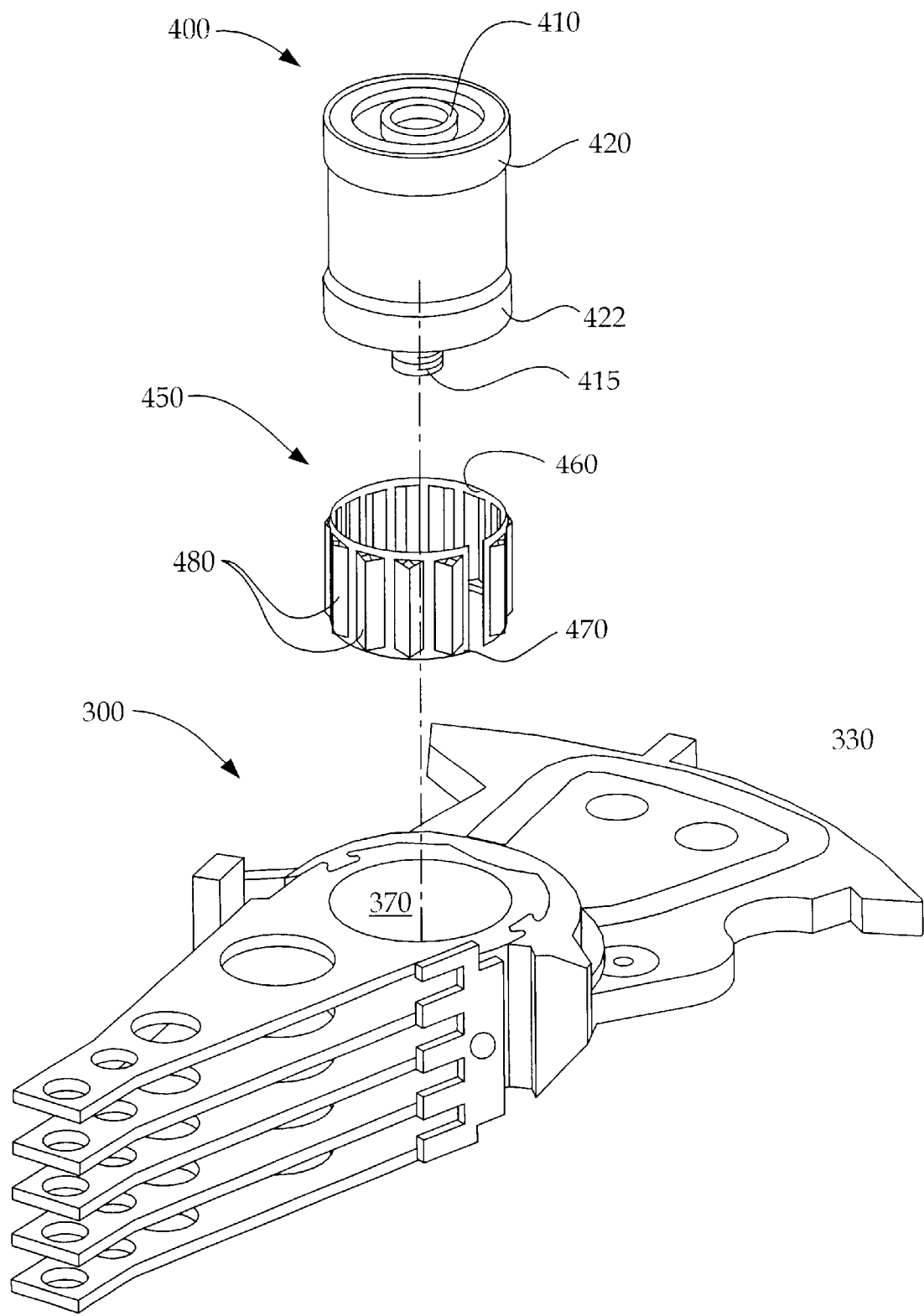
FIG. 2 shows an exploded view of an actuator incorporating the bearing mounting assembly of the present invention.

FIG. 2 shows a partially exploded, perspective view of an actuator 300 incorporating the bearing assembly of the present invention. The actuator 300 has a bore 370 formed therethrough which receivingly engages a bearing assembly. The bearing assembly is shown to include a bearing cartridge 400 and a tolerance ring 450 compressingly interposed between the bearing cartridge 400 and the bore 370 to retain the bearing cartridge 400 within the bore 370. The cartridge 400 and the tolerance ring 450 are installed by first placing the tolerance ring 450 around the cartridge 400, and then axially inserting the cartridge-ring assembly into the actuator bore 300.

Figure 3:
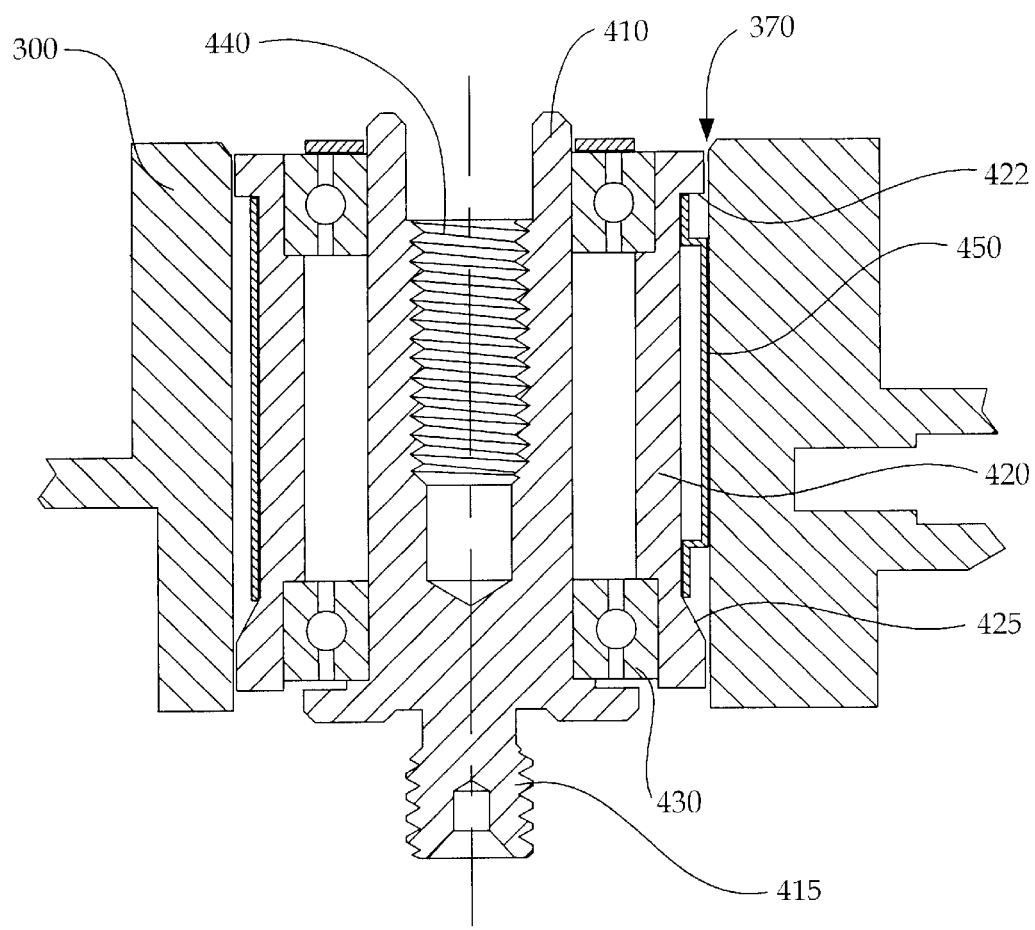
FIG. 3 depicts a cross-sectional view of a bearing mounted within an actuator.

FIG. 3 shows a cross-sectional view of the actuator 300 with the bearing cartridge 400 and the tolerance ring 450 installed in actuator bore 370. The cartridge 400 has a stationary pivot shaft 410 which has a threaded projection 415 at its lower end for secure mounting to the floor of deck 110. The cartridge 400 also includes an outer sleeve 420 connected to the shaft 410 at upper and lower ends thereof by a pair of ball bearings 430. The stationary shaft 410 may also include an upper threaded opening 440 to receive a fastener (not shown) for attachment of the stationary shaft 410 to the top cover 120. It will be readily understood that the shaft 410 could be attached to the deck 110 and cover 120 by other means than those disclosed here without departing from the spirit of the present invention. In this manner it will be understood that the stationary shaft 410 is rigidly supported and the sleeve 420 is free to rotate about the stationary shaft 410. The sleeve 420 of the bearing cartridge 400 forms an upper shoulder 422, a lower shoulder 425, and a groove of a reduced diameter between the shoulders 422, 425. The tolerance ring 450 is seated in the groove before the bearing cartridge 400 is placed into the bore 370. As can be clearly seen in FIG. 3, the upper shoulder 422 of sleeve 420 extends horizontally, at a right angle to the vertical surface of the groove in the sleeve 420. It is formed this way such that the when the cartridge 400 is forced downwardly into the bore 370, the upper end of the ring 450 abuts the shoulder 422 and is forced into the bore against the frictional forces created between the ring 450 and the bore 370.

As can be seen in FIG. 2, the tolerance ring 450 is typically a split ring member which forms a cylindrical inner surface 460 and a cylindrical outer surface 470, with a plurality of projecting corrugations 480 forming a corrugated surface on the outer surface 470. Such tolerance rings are well-known, for a variety of purposes, and examples of such rings are those manufactured by USA Tolerance Ring.

Figure 4:
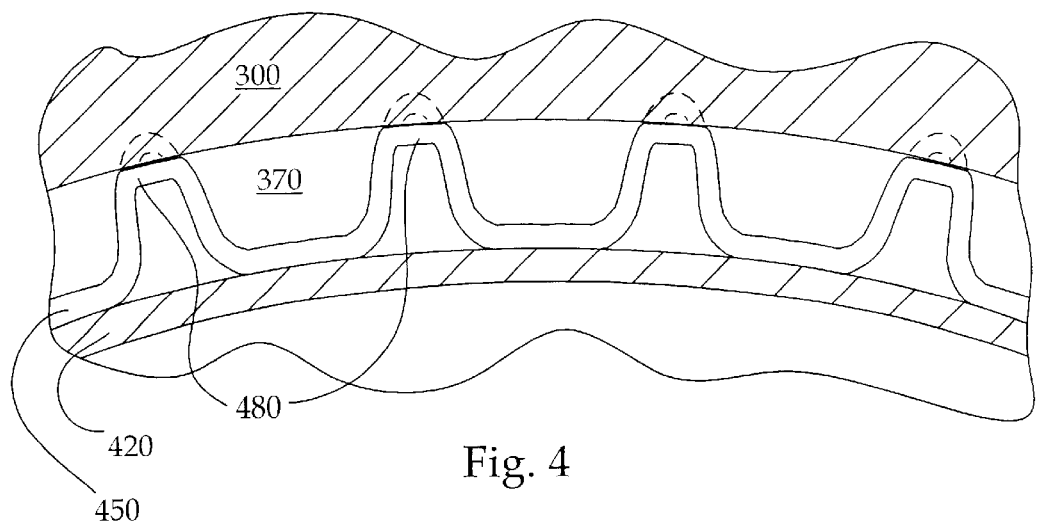
FIG. 4 shows a cross-sectional view of a tolerance ring sandwiched between a bearing cartridge and actuator bore.

It will be understood from FIG. 4 that the tolerance ring 450 is sandwiched between the groove of the sleeve 420 and the surface of the bore 370 of the actuator 300. The sleeve 420 and tolerance ring 450 combine to provide an effective outer diameter that is greater than the diameter of bore 370. As such, the sleeve 420 and tolerance ring 450 combination can be press fit into the bore 370. The press-fit compresses the corrugations 480 as shown in FIG. 4 where the broken lines denote the shape of the corrugations 480 before insertion into the bore 370. The compression imparted to the corrugations 480 of the tolerance ring 450 creates sufficient frictional resistance to retain the tolerance ring 450 within the bore 370, preventing displacement of the tolerance ring 450 relative to the actuator both axially and rotationally.

The frictional resistance between the tolerance ring 450 and the actuator bore 370 is typically greater than that between the ring 450 and cartridge sleeve 420. This is primarily because the corrugations 480 of the ring 450, which are made of steel, actually mildly deform the softer aluminum from which the actuator bore 370 is formed. The bearing cartridge sleeve 420, however, is typically made of steel, and much less frictional resistance is created between the machined surface of the sleeve 420 and the inner surface 460 of the tolerance ring 450. It follows that even when the tolerance ring 450 is securely axially located within the bore 370, slippage may occur nonetheless between the cartridge 400 and the tolerance ring 450 if measures are not taken to prevent it.

As explained above with respect to FIG. 3, the tolerance ring 450 abuts against upper shoulder 422 during assembly, which forces the ring 450 into the bore 370 along with the cartridge 400. After assembly, this upper shoulder 422 also prevents the cartridge 400 from moving downwardly relative to the sleeve during a shock event. In the past, cartridges have typically been provided with a similar lower shoulder in order to prevent upward movement of the cartridge 400 relative to the ring 450. In fact, if it were possible to make the height of the ring 450 precisely equal to that of the groove, the cartridge 400 would be securely located between the shoulders and axial movement of the cartridge 400 would not be possible. In reality, however, it has been found to be impractical to attempt to manufacture the rings 450 with such precision For this reason, they are generally designed to be slightly shorter than the height of the groove of the sleeve 420 to ensure that they may easily placed within the groove during the assembly process. Upon assembly, there has been clearance between the lower edge of the ring 450 and the lower shoulder on the order of a few thousands of an inch. It is within this tolerance that the cartridge 400 may slide within the ring 450 when subject to shock.

Figure 5:
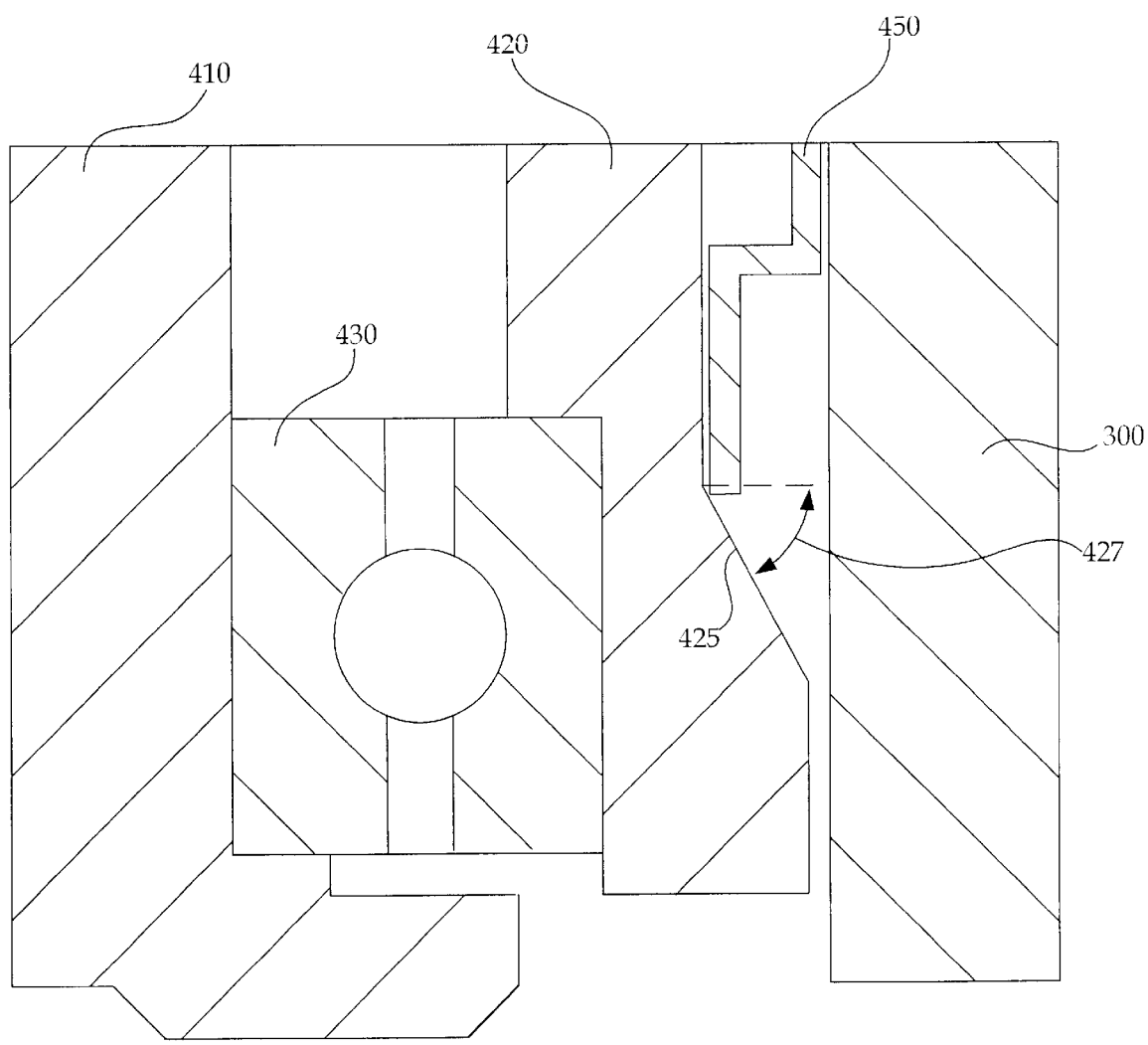
FIG. 5 shows an enlarged view of the interface between the tolerance ring and the bearing cartridge as shown in FIG. 4.

In a preferred embodiment of the present invention, however, the lower shoulder 425 is configured so as to be angled relative to the vertical surface of the groove in the sleeve 420 as illustrated in FIG. 5. The inclined surface 425 is formed as a chamfer extending about the circumference of the cartridge 400. The inclined surface 425 is positioned such that when the upper edge of the ring 450 abuts the upper shoulder 422, the lower edge slightly overlies the uppermost portion of the inclined surface 425. This eliminates the tolerance problem associated with a square lower shoulder discussed above, as the cartridge 400 and the ring 450 may easily be pressed into the bore 370, even thought the height of the ring 450 is greater than the height of the vertical surface between upper and lower shoulders 422,425.

Moreover, once assembled, the inclined surface 425 assists in preventing axial movement of the cartridge 400 relative to the tolerance ring 450. As explained above, the upper edge of the ring 450 abuts the upper shoulder 422 of the sleeve 420 when the cartridge 400 and ring 450 are initially inserted into the actuator bore 370, thereby preventing the actuator 300 from moving upwardly relative to the cartridge 400. When subject to a shock event tending to exert a downwardly directed force on the actuator 300, any downward movement of the ring 450 will cause it to be forced radially outward by the inclined surface 425 toward the surface of the actuator bore 370. Because the ring 450 is already in contact with the surface of the bore 370, however, any expansion of the ring will be resisted, thereby further resisting movement of the ring 450 relative to the cartridge 400. The lower edge of the ring 450 is effectively "wedged" between the inclined surface 425 of the cartridge 400 and the inner surface of the bore 370.

The precise angle at which the inclined surface extends relative to horizontal, as illustrated at 427 in FIG. 5, will vary depending upon design requirements and limitations which will vary from drive to drive. In one embodiment, angle 427 is about 73 degrees from horizontal. At this gentle slope, slight variances in the length of ring 450 are easily accommodated without forcing the ring 450 too far outward so as to interfere when the cartridge 400 and ring 450 are pressed into the bore 370.

In another embodiment, the angle 427 is about 45 degrees from horizontal. Once the cartridge 400 and ring 450 are installed, this steeper angle resists axial movement of the actuator 300 and ring 450 more effectively than the 73 degree slope discussed above, as the outer surface of the ring 450 will be forced outwardly more rapidly during a shock event. These embodiments are provided for example only; it should be clear that a variety of different angles could be effective in facilitating assembly while preventing slippage.

Of course, it should be understood that a bearing cartridge mounting arrangement may differ from the example described above without departing from the spirit of the claimed invention. For example, some bearing assemblies may be inserted into an actuator bore from below; in these cases, the inclined surface would preferably be located at the upper end of the sleeve, while the conventional horizontal shoulder would be positioned at the lower end of the sleeve.

Alternately stated, a first contemplated embodiment of the invention takes the form of an actuator mounting assembly having a bearing cartridge (such as 400) configured to be positioned in a bore (such as 370) within the actuator (such as 300). The cartridge (such as 400) includes a shaft (such as 410) having a substantially vertical axis and a generally cylindrical sleeve (such as 420) rotatable about the shaft (such as 410). The sleeve (such as 420) includes a first surface (such as 425) extending at an angle (such as 427) between vertical and horizontal. The assembly also includes a retention element (such as 450) configured to be positioned between the sleeve (such as 420) and a surface of the bore (such as 370). The first surface (such as 425) is configured to contact the retention element (such as 450) so as to prevent relative movement between the sleeve (such as 420) and the retention element (such as 450). The retention element (such as 425) may be corrugated sheet substantially surrounding the cartridge (such as 400). The first surface (such as 425) my take the form of a chamfer extending about the circumference of the sleeve (such as 420). The first surface (such as 425) may extend at an angle (such as 427) of about 73 degrees from horizontal. The sleeve (such as 420) may include a second substantially horizontally extending surface (such as 422) configured to contact the retention element (such as 450) so as to prevent relative movement between the sleeve (such as 420) and the retention element (such as 450).

Alternately stated, a second contemplated embodiment of the invention takes the form of a disc drive (such as 100) having a housing (such as 110,120), a substantially horizontally extending actuator (such as 300) having a bore (such as 370) therein and a bearing cartridge (such as 400) fixed to the housing (such as 110,120) and positioned within the bore (such as 370). The cartridge (such as 400) has a substantially vertical axis of rotation. The drive (such as 100) further includes a resilient element (such as 450) positioned between the cartridge (such as 400) and a surface of the bore (such as 370). An element is associated with the cartridge (such as 400) having a surface (such as 425) extending at an angle (such as 427) between horizontal and vertical. The surface (such as 425) contacts the resilient element (such as 450) so as to prevent all axial movement of the actuator (such as 300) relative to the cartridge (such as 400). The resilient element (such as 450) may take the form of a tolerance ring. The surface (such as 425) may extend at an angle (such as 427) of about 45 degrees from horizontal. The resilient element (such as 450) may have upper and lower edges and the surface (such as 425) may contact one of the upper and lower sleeve edges.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

We claim:

1. An actuator mounting assembly, comprising:
   a bearing cartridge configured to be positioned in a bore within the actuator, the cartridge comprising:
   a shaft having a substantially vertical axis; and
   a generally cylindrical sleeve rotatable about the shaft, the sleeve further comprising a first surface extending at an angle between vertical and horizontal; and
   a retention element configured to be positioned between the sleeve and a surface of the bore, the first surface being configured to contact the retention element so as to prevent relative movement between the sleeve and the retention element.

2. The mounting assembly of claim 1 in which the retention element comprising a corrugated sheet substantially surrounding the cartridge.

3. The mounting assembly of claim 1 in which the first surface comprises a chamfer extending about the circumference of the sleeve.

4. The mounting assembly of claim 1 in which the first surface extends at an angle of about 73 degrees from horizontal.

5. The mounting assembly of claim 1 in which the sleeve further comprises a second substantially horizontally extending surface, the second surface being configured to contact the retention element so as to prevent relative movement between the sleeve and the retention element.

6. A disc drive, comprising:
   a housing;
   a substantially horizontally extending actuator having a bore therein;
   a bearing cartridge fixed to the housing and positioned within the bore, the cartridge having a substantially vertical axis of rotation;
   a resilient element positioned between the cartridge and a surface of the bore; and
   an element associated with the cartridge having an inclined surface contacting the resilient element so as to prevent all axial movement of the actuator relative to the cartridge.

7. The disc drive of claim 6 in which the resilient element comprises a tolerance ring.

8. The disc drive of claim 6 in which the surface extends at an angle of about 45 degrees from horizontal.

9. The disc drive of claim 6 in which the resilient element has upper and lower edges, the surface contacting one of the upper and lower sleeve edges.

10. A disc drive comprising:
    a bearing cartridge;
    an actuator connected to the cartridge so as to be rotatable about an axis; and
    means for restricting axial movement of the actuator relative to the cartridge.

* * * * *